(12) United States Patent
Schaeffer

(10) Patent No.: US 8,630,731 B2
(45) Date of Patent: *Jan. 14, 2014

(54) METHOD OF CALIBRATING AN OPHTHALMIC PROCESSING DEVICE, MACHINE PROGRAMMED THEREFOR, AND COMPUTER PROGRAM

(71) Applicant: National Optronics, Inc., Charlottesville, VA (US)

(72) Inventor: Kurt W. Schaeffer, Waynesboro, VA (US)

(73) Assignee: National Optronics, Inc., Charlottesville, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/777,406

(22) Filed: Feb. 26, 2013

(65) Prior Publication Data

US 2013/0170919 A1    Jul. 4, 2013

Related U.S. Application Data

(63) Continuation of application No. 13/169,477, filed on Jun. 27, 2011, now Pat. No. 8,386,068, which is a continuation of application No. 11/606,036, filed on Nov. 30, 2006, now Pat. No. 7,970,487.

(51) Int. Cl.
*G06F 19/00*    (2011.01)
*B23B 35/00*    (2006.01)

(52) U.S. Cl.
USPC ............................. 700/174; 408/1 R; 451/42

(58) Field of Classification Search
USPC ................. 700/117, 159, 160, 174, 176, 180; 451/1, 5, 42; 408/1 R, 8, 87, 110
See application file for complete search history.

(56) References Cited

U.S. PATENT DOCUMENTS

| | | | | |
|---|---|---|---|---|
| 4,789,770 | A * | 12/1988 | Kasner et al. | 219/121.7 |
| 5,933,218 | A * | 8/1999 | Matsubara et al. | 355/67 |
| 6,642,480 | B2 * | 11/2003 | Amako et al. | 219/121.75 |
| 6,720,519 | B2 * | 4/2004 | Liu et al. | 219/121.61 |
| 6,815,638 | B2 * | 11/2004 | Liu | 219/121.71 |
| 7,463,944 | B2 * | 12/2008 | Schaeffer | 700/164 |
| 7,970,487 | B2 * | 6/2011 | Schaeffer | 700/174 |
| 8,386,068 | B2 * | 2/2013 | Schaeffer | 700/174 |
| 2003/0102291 | A1 * | 6/2003 | Liu et al. | 219/121.73 |
| 2005/0062932 | A1 * | 3/2005 | Kosaka et al. | 351/159 |
| 2006/0011617 | A1 * | 1/2006 | Covarrubias et al. | 219/680 |

* cited by examiner

*Primary Examiner* — Charles Kasenge
(74) *Attorney, Agent, or Firm* — Berenato & White, LLC

(57) ABSTRACT

The present invention is directed to a method of calibrating drill depth of an ophthalmic processing device. A number of drill cycles are selected for drilling an expected number of holes in a lens blank. The selected number of drill cycles is performed. The drill depth of each consecutive drill cycle varies incrementally. An actual number of locations the drill bit contacted the lens blank during the drill cycles is compared to the expected number of holes. The drill depth is adjusted depending on the compared values. A method of calibrating drill hole size is also disclosed.

20 Claims, 8 Drawing Sheets

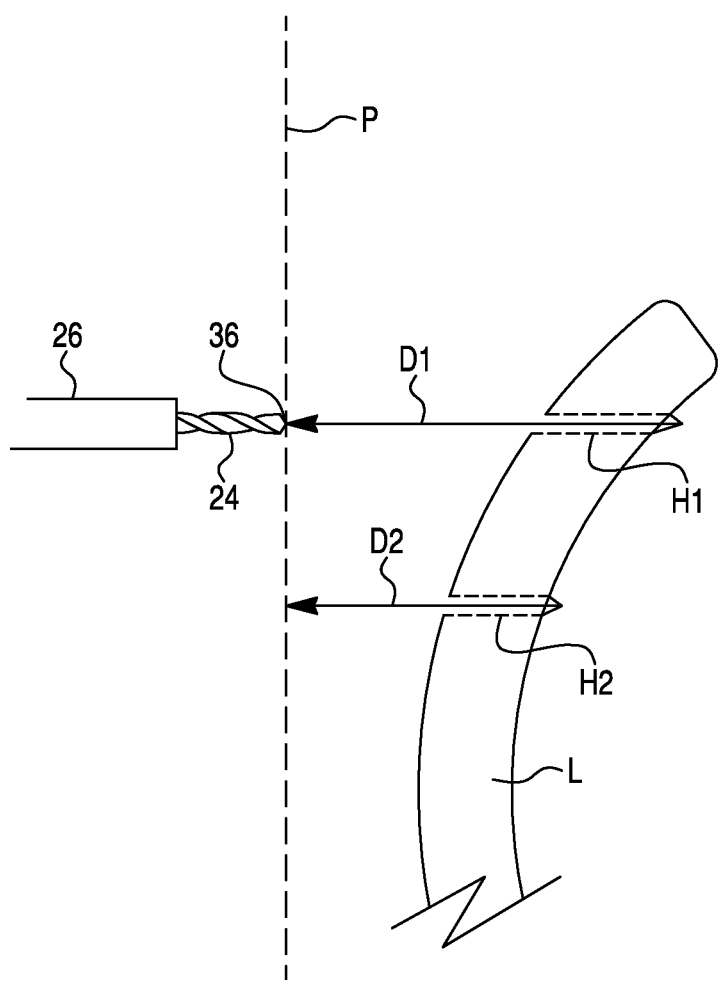

METHOD OF CALIBRATING AN OPHTHALMIC PROCESSING DEVICE, MACHINE PROGRAMMED THEREFOR, AND COMPUTER PROGRAM

This application is a continuation of U.S. Ser. No. 13/169,477, filed Jun. 27, 2011, now U.S. Pat. No. 8,368,068, which is is a continuation of U.S. Ser. No. 11/606,036, filed Nov. 30, 2006, now U.S. Pat. No. 7,970,487, which are hereby incorporated by reference in their entireties.

COMPUTER PROGRAM LISTING APPENDIX

A computer program listing appendix is submitted herewith on compact disc recordable (CD-R) as Appendix A, and the material thereon is incorporated herein by reference. Duplicate copies of Appendix A are provided as Copy 1 and Copy 2. Copy 1 and Copy 2 are identical.

The files contained on Copies 1 and 2 are as follows:

| File Name: | Size in Bytes: | Date of CD Creation: |
|---|---|---|
| DrillCalibration | 6,039 | 14 Nov. 2006 |

FIELD OF THE INVENTION

The present invention is directed to a method of calibrating drill depth of an ophthalmic processing device. A number of drill cycles are selected for drilling an expected number of holes in a lens blank. The selected number of drill cycles is performed. The drill depth of each consecutive drill cycle varies incrementally. An actual number of locations the drill bit contacted the lens blank during the drill cycles is compared to the expected number of holes. The drill depth is adjusted depending on the compared values. A method of calibrating drill hole size is also disclosed.

BACKGROUND OF THE INVENTION

Prescription eyeglass lenses are curved in such a way that light is correctly focused onto the retina of a patient's eye, improving vision. Such lenses are formed from glass or plastic lens "blanks" having certain desired properties to provide the correct prescription for the patient. The blanks are usually circular and of substantially larger dimension compared to the relatively smaller finished lenses assembled into eyeglass frames. Therefore, a lens blank must be edged to fit an eyeglass frame selected by the patient.

Ophthalmic laboratory technicians cut, grind, edge, and polish blanks according to prescriptions provided by dispensing opticians, optometrists, or ophthalmologists. The specifications include the patient's full prescription, including: 1) the total power the finished lens must have; 2) the strength and size of any segments, if needed (i.e. multifocal lenses); 3) the power and orientation of any cylinder curves; and 4) the location of the optical center and any inducted prism that may be needed.

In addition, the large diameter blank is sized and shaped to fit into the frame selected by the patient. The lens blank may be shaped using an edger, such as the edger disclosed in U.S. Pat. No. 6,203,409 to Kennedy et al., the disclosure of which is incorporated herein by reference. The blank is edged so that the periphery of the finished lenses fit into the openings on the frames.

Edging of a lens blank typically requires the application of a block to a surface thereof. The block is releaseably secured to a clamp assembly, so that rotation of the clamp assembly causes corresponding rotation of the lens blank. As the blank is rotated, the periphery of the blank may be cut to a desired size using a router tool. The blank may be either ground or cut. Wet edgers use diamond-impregnated wheels with different abrasive grits to grind the lens material. A coolant is sprayed on the wheels during edging to reduce heat. Dry edgers use carbide steel or diamond blades mounted on the spindle of a motor to shave the lens. The lens periphery may also be polished using a polishing tool. Some edgers are also able to form a bevel about the periphery of the lens.

Information relating to the size and shape of the lens needed for a particular frame (i.e. trace data) may be generated, and subsequently transmitted to the edger. Such trace data may be provided by frame manufacturers, or generated by a tracer machine. Trace data may be downloaded and/or transmitted to a storage medium in a control system, such as a central processing unit, in communication with the edger. The edger processes the edge of the lens blank to create an edge profile according to the trace data. The finished lens may then be assembled with the selected eyeglass frames.

In order to improve efficiency, some edgers use CNC (Computer Numeric Control) technology whereby a computer controls the lens processing equipment by following encoded commands. The commands are based on information from frame tracings or internal lens probes and the user. Information relating to the size and shape of the lens needed for a particular frame (i.e. trace data) may be generated, and subsequently transmitted to the edger. The trace data may be stored in the storage medium and recalled by the control system as needed.

Some lenses require that the lens contain drill features in the surface of the lens. For example, some frame assemblies require that one or more holes be drilled in the lenses, particularly lenses to be used in rimless style frames. Several factors to consider when determining the hole position include the horizontal and vertical coordinates, lens base curve, wrap angle, and the mounting's pantoscopic tilt. Hand drilling is used by some laboratories. Other laboratories use a drill press.

Typically, one drill bit is used to cut holes of varying sizes. In order to provide proper drill hole size, many conventional techniques require a technician to drill holes into a lens blank, and then make an estimation of the hole size correction needed. This is often a tedious and time consuming operation. In addition, accurate drill depth is required for optimal functioning of a lens drilling mechanism. Holes must typically be drilled completely through the lens blank. It is not always obvious to the technician that an adjustment is needed to achieve proper drill depth, particularly when drilling lens blanks having a relatively high wrap, such as frames having a curvature greater than 6 diopters.

SUMMARY OF THE INVENTION

The present invention is directed to a method of calibrating drill depth of an ophthalmic processing device. An ophthalmic lens blank and a processing device are provided. The processing device has a drill bit for drilling holes in the lens blank. At least one of the drill bit and the lens blank is moveable toward and away from the other during a drill cycle by a predetermined distance defining a drill depth. A number of drill cycles are selected for drilling an expected number of holes in the lens blank. The selected number of drill cycles is performed by the processing device. The drill depth of each consecutive drill cycle varies incrementally. An actual number of locations the drill bit contacted the lens blank during the drill cycles is compared to the expected number of holes. Drill depth is decreased if the actual number of holes is more than the expected number of holes. Drill depth is increased if the actual number of holes is less than the expected number of holes.

The present invention is also directed to a method of calibrating an ophthalmic processing device used to cut holes of variable diameter in a lens blank. A lens blank and a processing device for drilling holes in the lens blank during drill cycles are provided. A base hole size having a predetermined diameter is selected. A number of drill cycles for forming a corresponding number of holes having expected diameters that vary incrementally is selected. The selected number of drill cycles is performed. The actual diameters of the holes formed during the performed drill cycles are compared to the predetermined diameter. The drill cycle that formed the hole having the actual diameter corresponding to the predetermined diameter is selected. The expected diameter of the selected drill cycle is adjusted to conform to the predetermined diameter.

A processing device programmed to drill holes in an ophthalmic lens blank is also disclosed. The device includes a processing device having a drill bit for drilling holes in a lens blank and a carriage for retaining the lens blank. One of the drill bit and the carriage are moveable toward and away from each other during a drill cycle. A central processing unit operably associated with the processing device controls operation thereof. A user interface in communication with the central processing unit receives and transmits commands from a user to the central processing unit. A computer program stored on a medium in communication with the central processing unit comprises a plurality of drilling instruction sets and a calibration instruction set. Each of the drilling instruction sets operably causes one of the drill bit and the carriage to move toward the other by a predetermined distance defining a drill depth. The drill depth associated with each drilling instruction set varies. The calibration instruction set adjusts each of the drill depths by a selected amount corresponding to a command received from the user interface.

A processing device programmed to drill holes in an ophthalmic lens blank is also disclosed. The device includes a processing device having a drill bit for drilling holes in a lens blank of variable size. A central processing unit operably associated with the processing device controls operation thereof. A user interface in communication with the central processing unit receives and transmits commands from a user to the central processing unit. A computer program stored on a medium in communication with the central processing unit includes a plurality of drilling instruction sets, and a calibration instruction set. Each of the drilling instruction sets operably causes the processing device to form a hole having a predetermined diameter defining a hole size. The hole sizes associated with each drilling instruction set varies. The calibration instruction set adjusts each of the hole sizes by a selected amount corresponding to a command received from the user interface.

The present invention also relates to a computer program stored on a medium for use in a drilling process employing a lens blank and a processing device. The computer program comprises: a) a plurality of drilling instruction sets, each of the drilling instruction sets operably causes one of a lens blank and a drill bit associated with a processing device to move toward the other by a predetermined distance defining a drill depth, wherein the drill depth associated with each drilling instruction set varies; and b) a calibration instruction set that adjusts each of the drill depths by a selected amount corresponding to a command received from a user interface in communication with the processing device.

The present invention also relates to a computer program stored on a medium for use in a drilling process employing a lens blank and a processing device, the computer program comprising: a) a plurality of drilling instruction sets, each of the drilling instruction sets operably causing a processing device to form a hole having a predetermined diameter defining a hole size, wherein the hole sizes associated with each of the drilling instruction sets varies; and b) a calibration instruction set that adjusts each of the hole sizes by a selected amount corresponding to a command received from a user interface in communication with the processing device.

BRIEF DESCRIPTION OF THE FIGURES

FIG. 4 is a fragmentary sectional view of an ophthalmic lens blank and drill bit with holes in the lens blank shown in phantom;

DETAILED DESCRIPTION OF THE INVENTION

The present invention is directed to a method of calibrating drill depth of an ophthalmic processing device. As known in the art, drill features are sometimes required on a finished ophthalmic lens blank, such as lenses for rimless glasses. Processing of an ophthalmic lens blank may therefore require the formation of one or more holes having a particular diameter.

Figure 1:
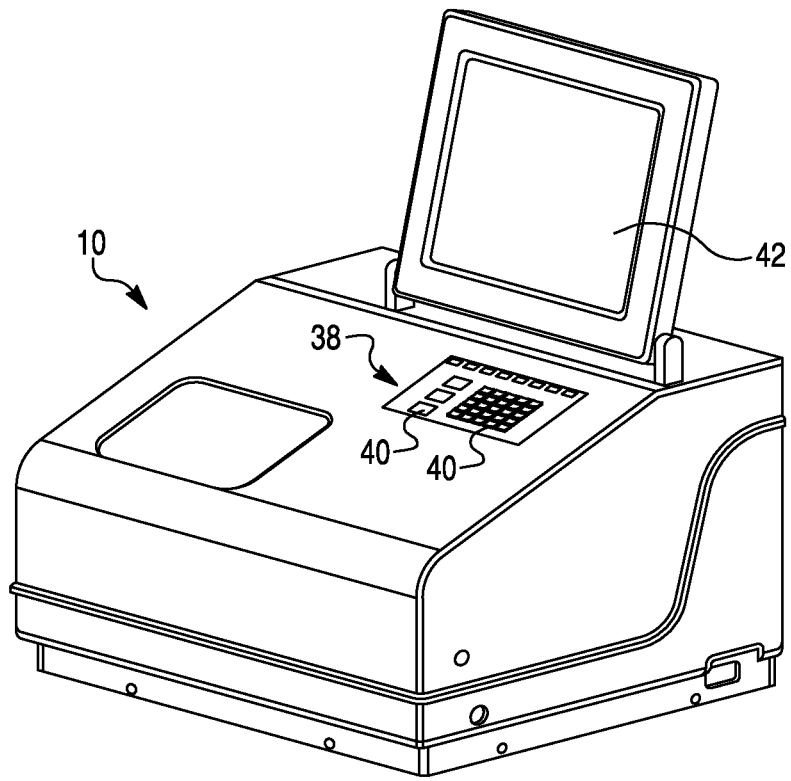
FIG. 1 is a perspective view of an edger device for use in a calibration process according to the present invention.
Figure 2:
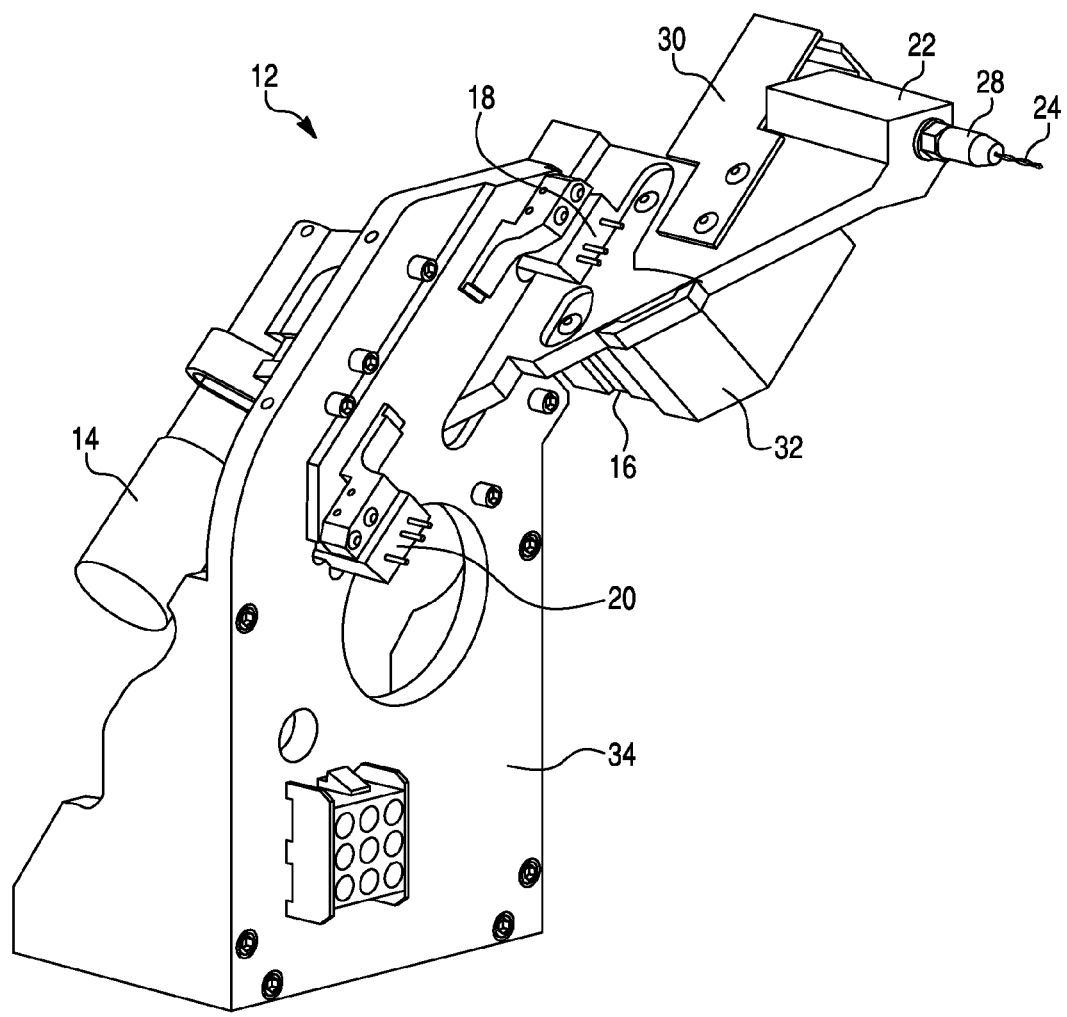
FIG. 2 is a perspective view of a drilling mechanism for use in a drilling process according to the present invention.

An edger and processing device 10 capable of forming drill features is best shown in FIG. 1. Suitable edger and processing devices are available from National Optronics of Charlottesville, Va., such as the 7E Patternless Edger machine. Processing device 10 may include a mechanism for edging the lens blank, and a drill mechanism 12 for forming drill features, as shown in FIG. 2.

A central processing unit, or "CPU", (not shown) is provided, preferably as an internal component of processing device 10. However, the CPU may also be external to processing device 10. The CPU is operably associated with processing device 10 and controls operation thereof. The CPU includes a storage medium. A computer program is stored on the medium and in communication with the CPU. Processing instructions, trace data, and other information relating to processing and edging may be stored in the storage medium and recalled by the CPU.

Figure 3:
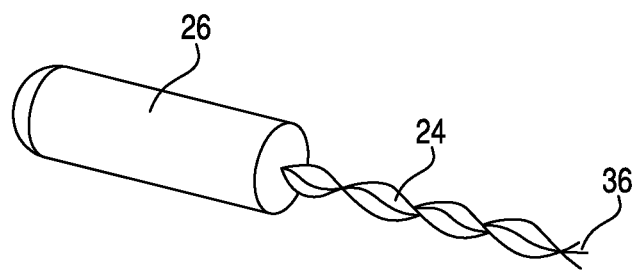
FIG. 3 is a perspective view of a drill bit usable on the drilling mechanism of FIG. 2.

Drill mechanism 12 includes a pivot motor assembly 14, a drill motor assembly 16, an upper drill switch assembly 18, a lower drill switch assembly 20, a drill spindle assembly 22, and a drill bit 24. As shown in FIGS. 2 and 3, drill bit 24 may be provided on a shaft 26 which is secured to drill spindle assembly 22. Shaft 26 may be secured to drill spindle assembly 22 via a collet nut 28 or other fastener. Drill spindle assembly 22 is coupled to drill motor assembly 16 via a drive belt (not shown) disposed under a cover plate 30. Drill motor assembly 16 thereby causes rotation of drill spindle assembly 22, and thus drill bit 24 via rotation of the associated drive belt.

In addition, drill spindle assembly 22 may pivot into a drilling position adjacent a lens blank to be drilled, or away from the lens blank when drilling mechanism 12 is not processing the lens blank, such as when processing device 10 is edging the lens blank. Drill spindle assembly 22 may be secured to a support arm 32, which is pivotably connected to and supported by a support bracket 34. Support arm 32, and therefore drill spindle assembly 22 and drill bit 24, may be pivoted toward and away from a drilling position adjacent the lens blank to be drilled via pivot motor assembly 14. For example, support arm 32 may be rotated about support bracket 34 in a counterclockwise direction about 180° away from the drilling position shown in FIG. 2.

Upper and lower drill switch assemblies 18, 20 may include sensors or mechanical switches which are activated by support arm 32. Switch assemblies 18, 20 are coupled to the CPU. When support arm 32 is in the drilling position, as shown in FIG. 2, upper drill switch assembly 18 may be activated and a signal transmitted to the CPU via associated wiring, which indicates that drill bit 24 is in the drilling position and ready for a drill cycle. Support arm 32 may be rotated away from the drilling position to a secondary position when drilling is not being performed. When support arm 32 is in the secondary position, lower drill switch assembly 20 may be activated and a signal transmitted to the CPU via associated wiring, which indicates that the drill spindle assembly 22 is pivoted away from the lens blank processing area. Edging or other processing of the lens blank may then be initiated, or the lens removed from processing device 10.

Preferably, when drill spindle assembly 22 is disposed in the drilling position, proximate the lens blank being processed, drill spindle assembly 22 is stationary during any drilling cycles being performed. Shaft 26 and drill bit 24 rotate, but preferably remain stationary in the axial direction during any drilling cycles being performed. Instead, the lens blank is preferably retained within a clamping carriage providing on processing device 10 which is moveable toward and away from drill bit 24, as known in the art. In this way, the lens blank may be moved toward and away from processing tools, such as a router tool or drill bit 24.

Processing device 10 also preferably includes a probe assembly for measuring the curvature of the lens blank, such as provided on the National Optronic's 7E Patternless Edger machine. As known in the art, the probe assembly includes a probe for measuring the distance between the carriage in an initial position and various locations on the lens blank. The overall shape of the lens blank is known from the trace data, which may be recalled from storage by the CPU. The curvature of lens blank may be determined based upon the variations in distance measured by the probe.

Once the curvature and shape of the lens blank are determined, the carriage and thus the lens blank retained therein may be moved toward and away from rotating drill bit 24 during a drill cycle. The relative movement between the lens blank and a distal end 36 of drill bit 24, or drill depth, during a particular drill cycle therefore depends upon the shape and curvature of lens blank. For example, as shown in FIG. 4, a first drill depth D1 may be required for drilling a first hole H1 (shown in phantom) in a lens blank L. A second drill depth D2, which is less than drill depth D1 measured from a plane P along which distal end 36 is disposed, may be required for drilling a second hole H2 (shown in phantom) disposed in a different location. The CPU determines the proper drill depth for a particular drill cycle depending on the location of the hole being drilled relative to the shape of lens blank L, which is known from the trace data. Proper drill depth is also determined based upon the curvature of lens blank L, as determined by the probe provided in processing device 10.

The carriage in which the lens blank is retained in processing device 10 is moveable horizontally as well as vertically relative to drill bit 24. As noted above, one drill bit, such as drill bit 24, may be used to cut holes of variable diameter. Drill bit 24 has a defined diameter, and therefore a hole formed by drill bit 24 has a diameter at least as large as the diameter of drill bit 24. For example, drill hit 24 may have a diameter of about 1 mm, and a length of about 8 mm. The diameter of the hole being drilled may be increased by moving lens blank L in a generally circular motion when drill bit 24 is disposed within the hole being formed. For example, coordinated movement of the carriage on which lens blank L is retained while drill bit 24 is disposed within a newly formed hole results in a hole having a diameter larger than the diameter of drill bit 24. Movement of the carriage is controlled by the CPU. The CPU operably causes processing device 10 to process lens blank L according to particular processing parameters.

Referring again to FIG. 1, processing device 10 preferably includes a control panel 38 mounted to an upper portion thereof which provides access by the technician to various controls, collectively 40. Processing parameters may be input into processing device 10 via controls 40. Controls 40 may be provided as a touch screen including a plurality of touch keys and input fields displayed thereon. Alternatively, a conventional keypad or other input device may be provided. Alternatively, an external input device operably associated with processing device 10 may be provided, such as a tablet or keypad.

Processing device 10 may also include a display 42 for displaying input fields, trace data, and other information corresponding to the processing parameters. As shown in FIG. 1, display screen 42 is an LCD display screen mounted on an upper portion of processing device 10. However, an external display operably associated with processing device 10 may be provided.

Processing parameters may provide for one or more holes to be drilled in a lens blank. Various input fields may be provided, which are displayed on display screen 42, such as an input field for selecting an expected or desired number of holes to be drilled in lens blank, an input field for selecting the location of each hole, and an input field for selecting the diameter of each hole. As noted above, drill depth is partially dependent on the shape and curvature of the lens blank being drilled, which is calculated by the CPU based upon the parameters selected by the technician, trace data, and curvature measurements.

Input fields may prompt the technician to enter numerical data corresponding to the number of holes desired, the diameter of each hole, and the location of each hole. The CPU may recall trace data relating to the shape of the lens blank in order to ensure proper placement of each hole thereon. The CPU locates and then drill the hole(s) at the selected position(s) based on the shape of the lens blank which is known from the trace data, as described more fully in Applicant's co-pending application Ser. No. 11/511,431, titled "Method Of Grooving and Drilling an Ophthalmic Lens Blank, Machine Programmed Therefor, and Computer Program", filed Aug. 29, 2006, the disclosure of which is incorporated herein by referenced.

The desired shape of the resulting lens may also be provided by the frame manufacturer, and downloaded to the CPU via as associated serial port. Such trace data is often accessible by the frame manufacturer's model number and size information, and may be easily downloaded to the CPU. Trace data may be stored on the associated storage medium and recalled by the CPU when needed. Accordingly, the technician may request particular stored or downloaded trace data via an associated input field via controls 40.

As noted above and shown in FIG. 4, the drill depth required to form a hole depends partially on the shape and curvature of the particular lens blank being drilled. Processing device is preferably calibrated for optimal drill depth, wherein the lens blank extends toward drill bit 24 a sufficient distance such that distal end 36 of drill bit 24 extends completely through the lens blank, but without extending substantially beyond this distance. Optimal drill depth between distal end 36 and the lens blank is therefore just enough to properly form the hole during the corresponding drill cycle.

The CPU calculates the distance between distal end 36 of drill bit 24 and the lens blank. The shape of the lens blank is known from the trace data, and the thickness and curvature of the lens blank are determined by the probe. As noted above, drill bit 24 is maintained in a fixed position in the axial direction, which is known to the CPU. The CPU therefore calculates the distance between distal end 36 and the lens blank based upon this information in order to determine optimal drill depth for a particular drill cycle.

Drill depth calculation is therefore partially dependent upon the position of distal end 36. If the orientation of distal end 36 relative to the carriage retaining the lens blank is altered, re-calibration of the calculations performed by the CPU may be required. For example, if drill bit 24 is replaced with a new drill bit having a longer or shorter length, the position of the distal end of the new drill bit will not be in a position 'known' by the CPU, resulting in faulty drill depth calculations. Rather, the CPU will continue to calculate drill depth based upon the position of the replaced drill bit 24. Likewise, if the probe assembly or carriage assembly are replaced, or their positions relative to drill bit 24 altered, drill depth calculations will be based upon incorrect data.

If drill depth is too short during a particular drill cycle, distal end 36 of drill bit 24 fails to contact, or fails to extend completely through, the lens blank. Given the size of the hole(s) being formed, it is not always obvious to the technician whether proper hole formation has been achieved. If drill depth is too long, distal end 36 continues to extend beyond the lens blank an unnecessarily long distance. An excessive drill depth increases the possibility of damage to the lens blank, and increases processing time.

Conventional techniques of re-calibrating drill depth required the technician to estimate the increase or decrease required, and input the estimated new values for drill depth for a particular cycle. The technician would then test the estimated values, and re-estimate an additional increase or decrease if needed, depending on the outcome of the test. Such techniques are tedious and time consuming.

Figure 5:
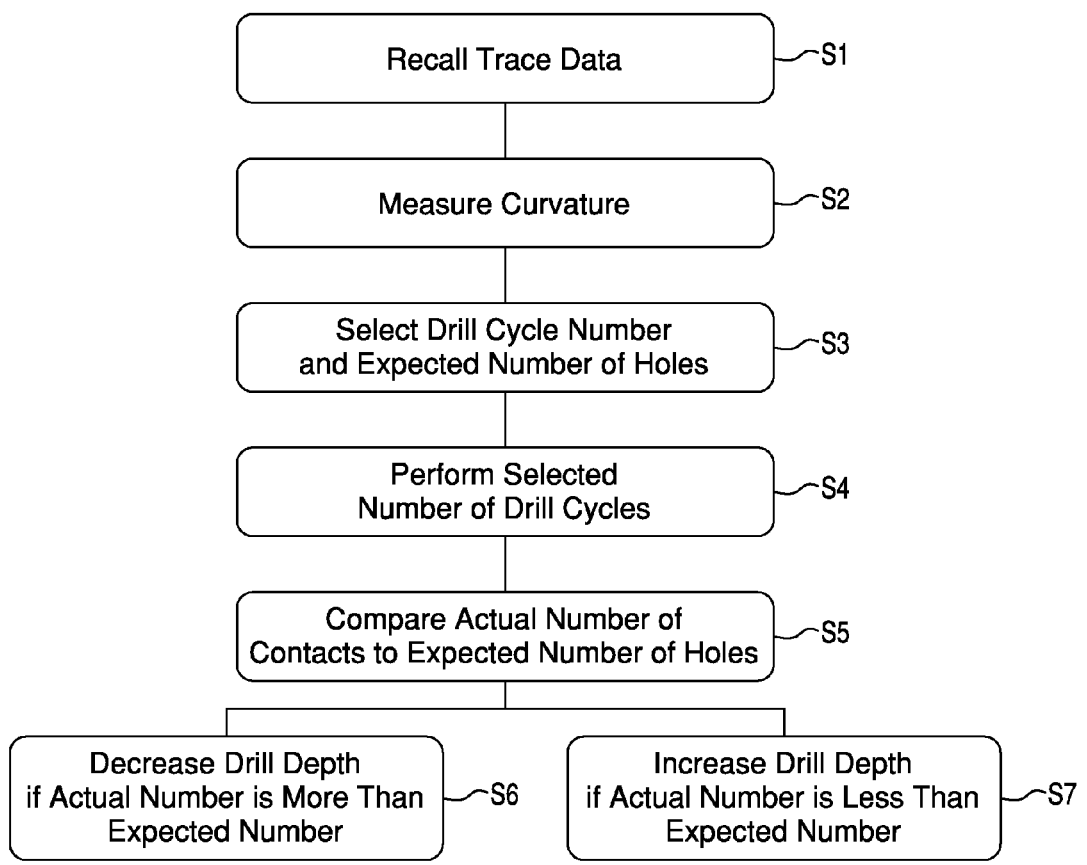
FIG. 5 is a chart showing processing steps for a calibration process according to the present invention.

The disclosed method of re-calibrating drill depth will be described with reference to FIG. 5. As described above, the lens blank is secured within the carriage of processing device 10, and drilling mechanism 12 is positioned in the drilling position proximate the lens blank. The CPU recalls trace data for the particular lens blank from the associated storage memory at S1. Trace data typically includes a list of points that define the shape of the lens and matching frame. The curvature of the lens is determined by the probe assembly at S2, and the resulting measurements are communicated to the CPU.

Then, the technician selects a number of drill cycles for drilling an expected number of holes in the lens blank at S3. The number of drill cycles need not equal the expected number of holes that will actually be drilled in lens blank L. Preferably, the expected number of holes that will be formed in the lens blank is less than the selected number of drill cycles. Therefore, distal end 36 should be spaced from and fail to contact the lens blank during at least one of the drill cycles. For example, the technician may select that six drill cycles be performed, with three holes expected to be drilled.

Figure 6:
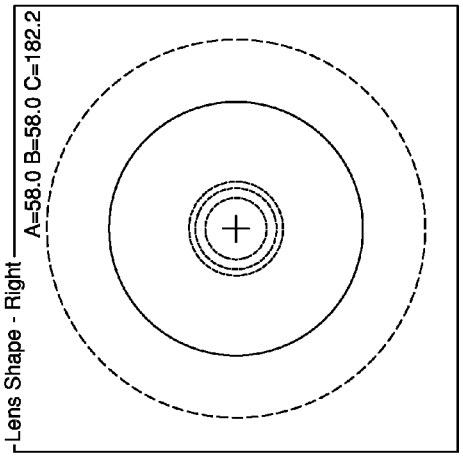
FIG. 6 is a view of a display screen showing input fields for a drill depth calibration method according to the present invention.

An exemplary input screen 100 showing various input fields is shown in FIG. 6. As described above, the technician may enter and/or alter values in each input field via controls 40. Drill data for six drill cycles is provided in input fields in the lower central portion of the screen, including input fields for horizontal and vertical positions, and hole diameter. Above the drill data input fields, the periphery of the lens to be drilled is displayed, which shows the position of the six drill cycles relative to the lens shape. Trace data and other edging information is also displayed, and may be adjusted, in the input fields disposed on the left hand side of the screen. Although drill data for six cycles has been entered, distal end 36 of drill bit 24 is expected to contact the lens blank only three times, as shown in the 'drill touch count' input field provided in the upper right portion of the display screen.

Figure 7A:
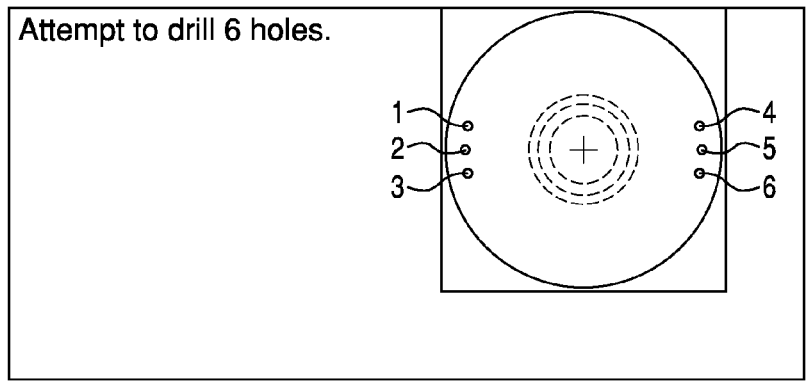
FIG. 7A is a chart showing a first processing step according to the present invention.

Referring again to FIG. 5, the selected number of drill cycles is then performed by processing device 10 at S4. For example, six drill cycles may be performed at selected positions 1-6 relative to the lens blank, as shown in FIG. 7A. A hole is drilled during each drill cycle at a particular location based upon selected processing parameters input by the technician, and based upon the shape and curvature of the lens blank. The drill depth of each consecutive drill cycle varies, preferably incrementally. The drill depth of each consecutive drill cycle may incrementally decrease or increase by a defined amount. For example, the drill depth may increase, or decrease, by about 0.1 mm during each consecutive drill cycle.

Then at S5, the actual number of times distal end 36 contacted the surface of the lens blank during the drill cycles performed at S4 is compared to the expected number of holes selected at S3. The technician enters the resulting number of contacts into processing device 10 via controls 40. If the actual number of contacts corresponds to the expected number of holes, no adjustment is required.

If the actual number of contacts is more than the expected number of holes, drill depth is decreased at S6. The amount drill depth is decreased may correspond to the number of times distal end 36 contacted the surface of lens blank. The greater the difference between the contact number and the expected number, the more drill depth is decreased. For example, the CPU will decrease drill depth a greater amount if distal end 36 contacted the lens blank six times, compared to the amount of decrease if the distal end 36 had contacted the lens blank four times. The amount of decrease may be a predetermined amount for each contact number above the expected number.

Figure 7B:
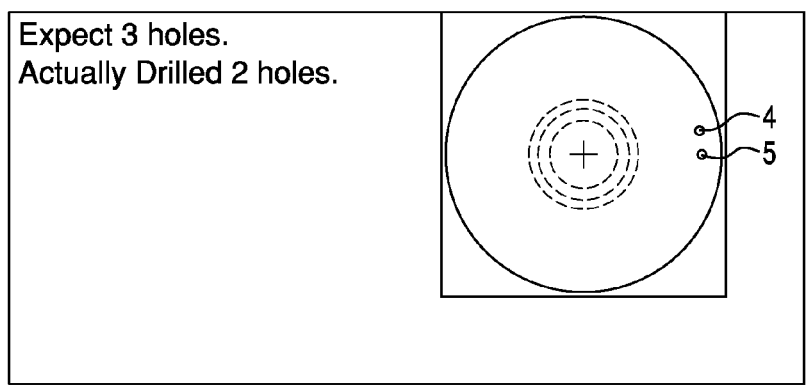
FIG. 7B is a chart showing a second processing step according to the present invention.
Figure 7C:
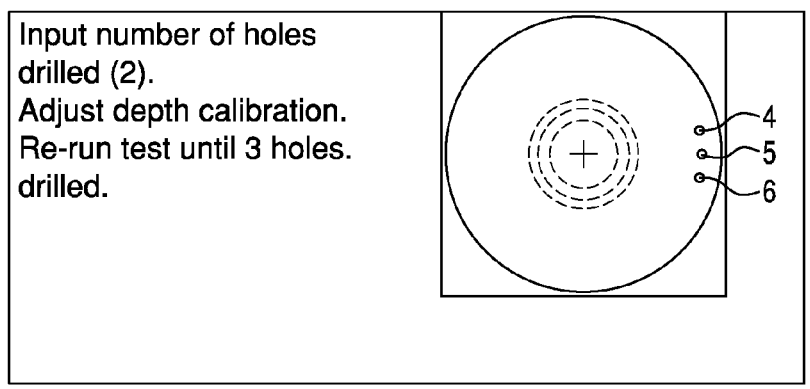
FIG. 7C is a chart showing a third processing step according to the present invention.

If the actual number of contacts is less than the expected number of holes, drill depth is increased at S7. The greater the difference between expected number and the contact number, the more drill depth is increased. The amount of increase may be a predetermined amount for each drill cycle that was expected but failed to contact the lens blank. As shown in FIG. 7B, three holes were expected to be drilled in the six drill cycles selected by the technician (shown in FIG. 7A). However, only two holes were actually formed in the lens blank at positions 4 and 5. The technician enters the number of holes actually formed via control 40. The CPU re-calibrates the distance between the lens blank and distal end 36 by increasing this distance, thereby effectively re-calibrating the position of distal end 24 relative to the lens blank. The CPU again performs the requested six drill cycles, which this time result in three holes 4, 5 and 6 being formed due to the implementation of an increased drill depth, as shown in FIG. 7C.

The position of distal end 36 is thereby re-established. The CPU may then re-calibrate optimal drill depth for any drill cycle based on the optimal drill depth determined during the test drill cycles performed, given the orientation of distal end 36 relative to the carriage retaining the lens blank has been re-established. Drill depth is adjusted and re-calibrated to ensure that the lens blank contacts drill bit 24 and distal end 36 extends through the lens blank just enough to form the hole during the corresponding drill cycle, without extending an excessive distance beyond the lens blank.

The CPU may re-calibrate drill depth by applying an algorithm which increases or decreases existing drill depth values stored in the associated memory by a predetermined amount corresponding to the drill depth deviation determined during the test cycles. An exemplary computer routine for re-calibrating drill depth according to the method disclosed above is provided in computer program listing Appendix A. However, it would be readily understood that other computer routines may be applied to achieve the disclosed method. Each drill depth value may be associated with a particular drilling instruction set provided in a computer program, which operably causes an associated drill cycle to be performed by processing device 10. The computer program may be stored on a medium in communication with the CPU, and initiated by the CPU in response to a command from a user via associated controls 40. The computer program automatically re-calibrates all drill depths associated with each of the drilling instruction sets by either increasing or decreasing drill depth.

The present invention is also directed to a method of calibrating drill hole diameter. As noted above, drill bit 24 may be used to cut holes of variable diameter in a lens blank. Drill bit 24 has a defined diameter, which is known to the CPU. In order to form a hole having a diameter larger than the diameter of drill bit 24, the carriage in which the lens blank is retained is moved in a circular motion when drill bit 24 is disposed within the hole being formed. The CPU operably causes coordinated movement of the carriage and/or associated moveable tables on which the carriage is disposed. If the carriage and/or drill bit 24 are replaced, the same coordinated movement controlled by the CPU may result in a hole having an unintended diameter. For example, if drill bit 24 is replaced with a new drill bit, the new drill bit may have a different diameter or rotate slightly different than the previous drill bit 24. This deviation may result in a hole diameter larger or smaller than intended. Thus, the CPU may periodically need to be re-calibrated to account for such deviations.

Thus, it may be desirable to ensure that the hole diameter selected by the technician is the hole diameter actually formed by processing device 10, particularly when drill bit 24 or other components of processing device 10 have been replaced or adjusted. Calibration of drill hole size ensures proper functioning of processing device 10.

Figure 8:
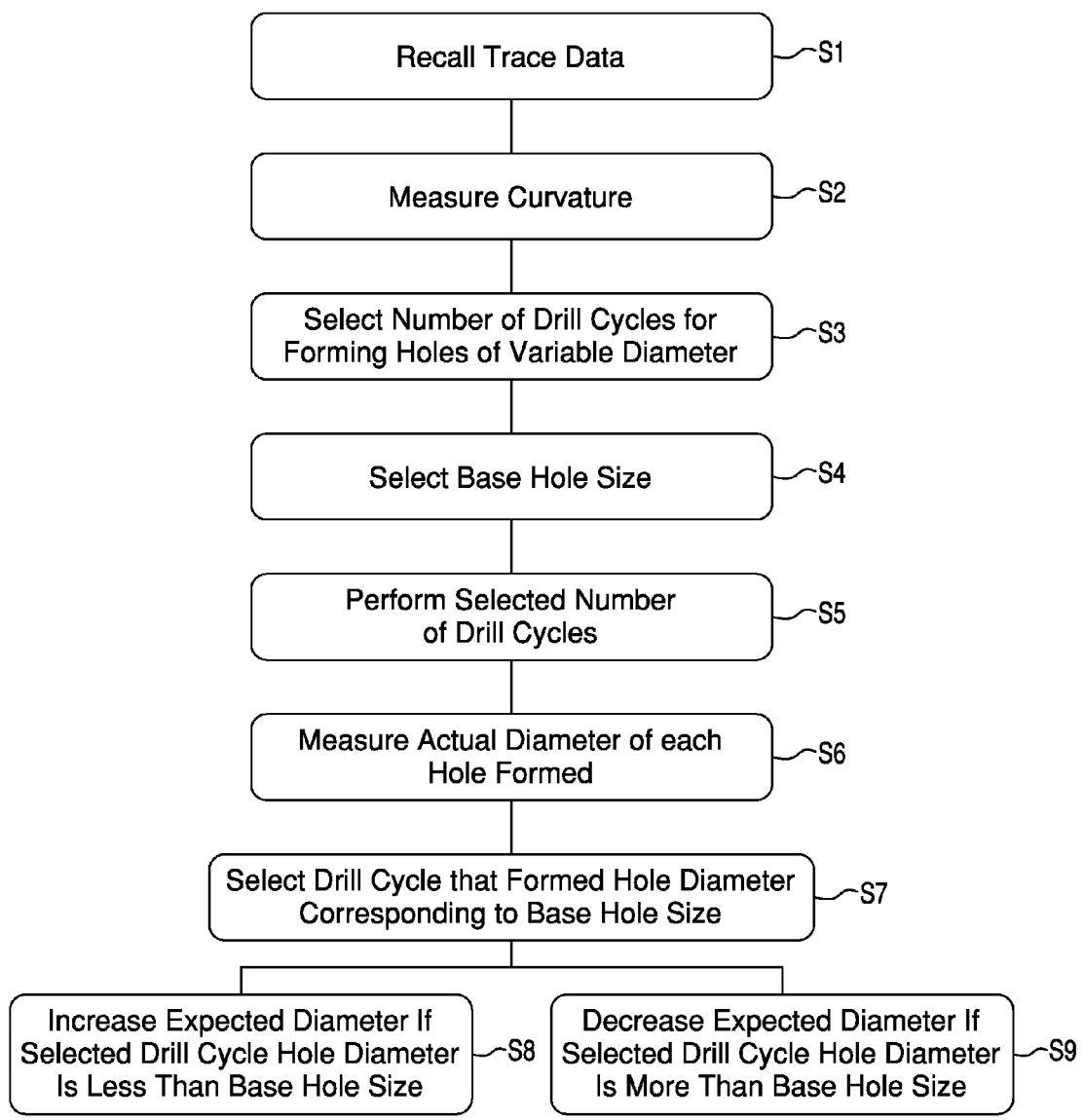
FIG. 8 is a chart showing processing steps for a calibration process according to another embodiment.

The disclosed method of re-calibrating drill hole diameter will be described with reference to FIG. 8. As described above, the lens blank is secured within the carriage of processing device 10, and drilling mechanism 12 is positioned in the drilling position proximate the lens blank. The CPU recalls trace data for the particular lens blank from the associated storage memory at S1. The curvature of the lens is determined by the probe assembly at S2, and the resulting measurements are communicated to the CPU.

Then at S3, the technician selects a number of drill cycles for drilling a plurality of holes in the lens blank having diameters that vary incrementally. The technician selects a base hole size which is equal to the hole diameter expected to be formed during one of the selected drill cycles at S4. Preferably, the base hole size is a value intermediate the range of hole diameters expected to be formed during the selected drill cycles.

Next, the selected number of drill cycles are performed at S5. A hole is drilled during each drill cycle at a particular location selected by the technician, and based upon the shape and curvature of the lens blank. Holes are formed during the drill cycles of variable diameter. Preferably, the diameter of each consecutive hole formed increases or decreases incrementally by a predetermined amount. For example, six holes may be drilled, with the expected hole diameter of a first drill cycle being 1.48 mm, the expected hole diameter of the second drill cycle being 1.49 mm, the expected hole diameter of the third drill cycle being 1.50 mm, the expected hole diameter of the fourth drill cycle being 1.51 mm, the expected hole diameter of the fifth drill cycle being 1.52, and the expected hole diameter of the sixth drill cycle being 1.53. The selected base hole size is preferably intermediate the smallest and largest diameter values. For example, a base hole size of 1.50 mm may have been selected.

The technician then measures the actual diameter of each hole formed at S6. Pin gauges may be used to determine the precise diameter of each hole formed. As known in the art, pin gauges are precision sized cylinders having a known diameter which may be used for measuring the inner diameter of cylindrical holes.

The technician then selects the drill cycle that formed a hole having an actual diameter corresponding to the base hole size at S7, which may be any one of the drill cycles performed. The expected diameter initially associated with the selected drill cycle is adjusted to conform with the base hole size.

If the expected diameter of the selected drill cycle is less than the base hole size, expected drill hole diameter is increased at S8. For example, the second drill cycle may have been selected as the drill cycle that formed an actual diameter corresponding to the base hole size of 1.50 mm, despite the second drill cycle expected to form a hole having a diameter size of 1.49 mm. The selected drill cycle is communicated to the CPU via controls 40. The CPU then adjusts drill diameter size by increasing the expected diameter of all drill cycles by 0.01 mm.

If the expected diameter of the selected drill cycle is more than the base hole size, expected drill hole diameter is decreased at S9. For example, the fifth drill cycle may have been selected as the drill cycle that formed an actual diameter corresponding to the base hole size of 1.50 mm, despite the fifth drill cycle expected to form a hole having a diameter size of 1.52 mm. The selected drill cycle is communicated to the CPU via controls 40. The CPU then adjusts drill diameter size by decreasing the expected diameter of all drill cycles by 0.02 mm. Once the deviation between the expected hole diameter and actual hole diameter is determined, the CPU may re-calibrate all expected hole diameters.

Figure 9:
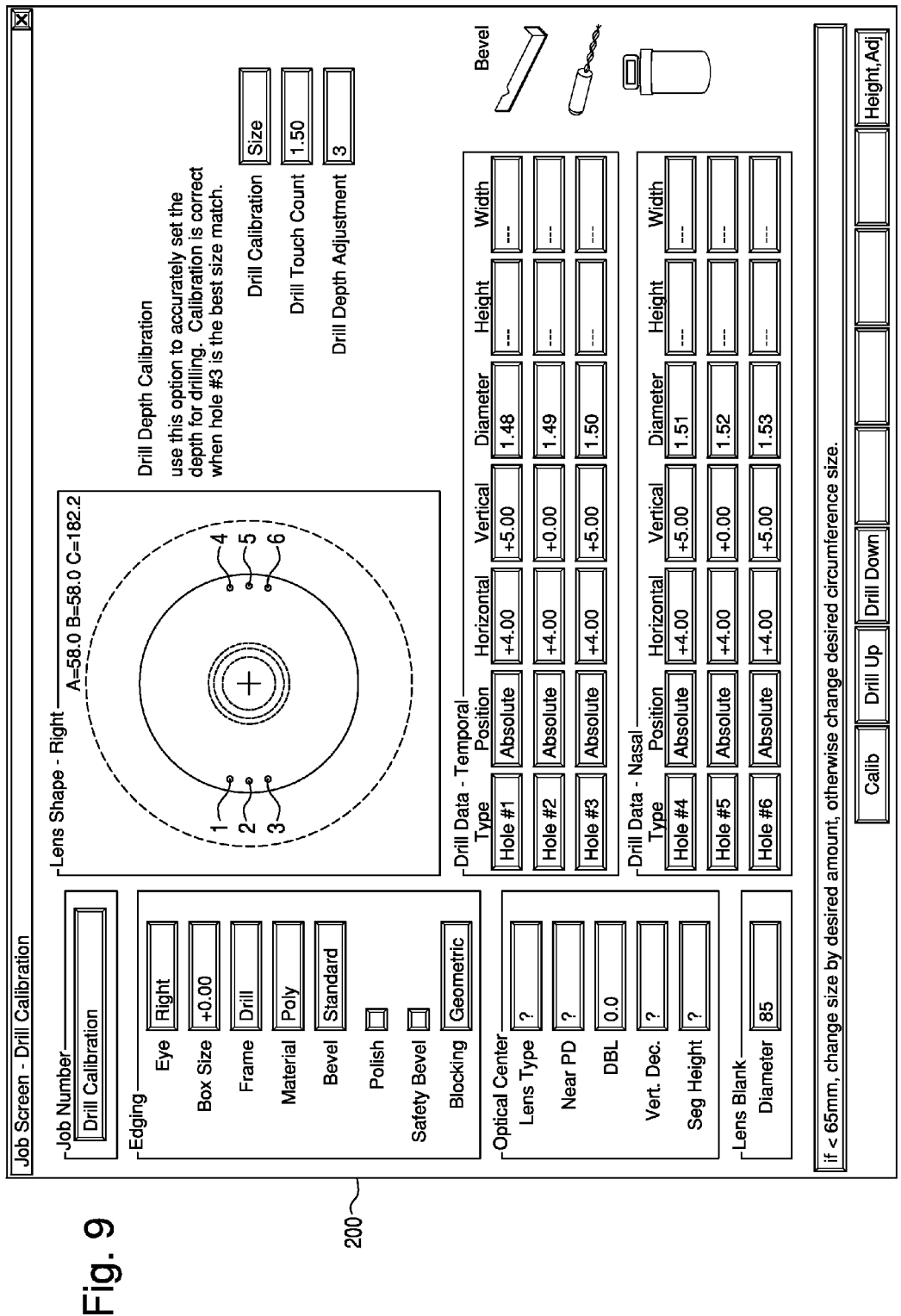
FIG. 9 is a view of a display screen showing input fields for a drill hole size calibration method according to the present invention.

An exemplary input screen 200 showing various input fields is shown in FIG. 9. As described above, the technician may enter and/or alter values in each input field via controls 40. Similar to input screen 100, drill data for six drill cycles is provided in input fields in the lower central portion of the screen, including input fields for horizontal and vertical positions, and hole diameter. Above the drill data input fields, the periphery of the lens to be drilled is displayed, which shows the position of the six drill cycles relative to the lens shape. Trace data and other edging information is also displayed, and may be adjusted, in the input fields disposed on the left hand side of the screen. The input screen indicates that "Drill Size Calibration" is being performed, as shown in the upper right portion of the display screen. In addition, an input field for selected "Size" for drill calibration is provided, along with an input field for a desired "Base Hole Size". The technician selects which of the six drill cycles was closest to the base hole size in input field "Best Size Match".

The CPU may re-calibrate hole diameters associated with drill cycles by applying an algorithm which adjusts the existing expected hole diameter values stored in the associated memory by a predetermined amount corresponding to the expected hole diameter deviation determined during the test cycles. An exemplary computer routine for re-calibrating hole diameter size according to the method disclosed above is provided in computer program listing Appendix A. However, it would be readily understood that other computer routines may be applied to achieve the disclosed method. Each hole diameter value may be associated with a particular drilling instruction set providing in a computer program, which operably causes an associated drill cycle to be performed by processing device 10 that forms a hole having a predetermined diameter defining a hole size. The computer program may be stored on a medium in communication with the CPU, and initiated by the CPU in response to a command from a user via associated controls 40. The computer program automatically re-calibrates all hole sizes associated with each of the drilling instruction sets by either increasing or decreasing hole size.

It will be apparent to one of ordinary skill in the art that various modifications and variations can be made to the disclosed invention without departing from the spirit of the invention. Therefore, it is intended that the present invention include all such modifications or variations, provided they come within the scope of the following claims and their equivalents.

I claim:

1. A method of calibrating drill depth of an ophthalmic processing device, comprising the steps of:
   providing a drill bit;
   providing a lens blank;
   selecting a number of drill cycles for drilling an expected number of holes in the lens blank at a drill depth;
   performing the selected number of drill cycles;
   comparing an actual number of locations the drill bit contacted the lens blank during said performing step to the expected number of holes; and
   adjusting the drill depth based on the relationship between an actual number of holes and the expected number of holes.

2. The method of claim 1, wherein the drill depth of each consecutive drill cycle incrementally decreases during said performing step.

3. The method of claim 1, wherein the expected number of holes is less than the selected number of drill cycles during said selecting step.

4. The method of claim 3, wherein a distal end of the drill bit is spaced from the lens blank during at least one of the drill cycles during said performing step.

5. The method of claim 4, wherein the distal end of the drill bit extends into the lens blank during at least one of the drill cycles during said performing step.

6. The method of claim 1, further comprising the step of decreasing the drill depth by a predetermined distance if the actual number of holes is more than the expected number of holes.

7. The method of claim 1, wherein the step of adjusting comprises increasing the drill depth by a predetermined distance if the actual number of holes is less than the expected number of holes.

8. A method of calibrating an ophthalmic processing device used to cut holes of variable diameter in a lens blank, comprising:
   operating a processing device comprising a drill bit to perform drill cycles on a lens blank, the drill cycles corresponding in number to a number of holes to be formed in the lens blank, the holes having respective expected diameters differing from one another;
   comparing actual diameters of holes farmed during the performed drill cycles to a predetermined diameter;
   selecting one of the drill cycles that formed the hole having the actual diameter corresponding to the predetermined diameter;
   adjusting the expected diameter of the selected one of the drill cycles to conform to the predetermined diameter;
   calibrating the expected diameters associated with the drill cycles by an adjustment value required to conform the expected diameter of the selected one during said adjusting step.

9. The method of claim 8, further comprising:
   providing the lens blank;
   utilizing the processing device for drilling holes in the lens blank during drill cycles;
   selecting a base hole size having a predetermined diameter;
   selecting a number of drill cycles for forming a corresponding number of holes having expected diameters that vary incrementally;
   performing the selected number of drill cycles.

10. The method of claim 9, including the further step of measuring the actual diameter of each hole formed after said performing step.

11. The method of claim 10, including the step of using pin gauges during said measuring step.

12. A processing device programmed to drill holes in an ophthalmic lens blank, comprising:
   a processing device having a drill bit for drilling holes in a lens blank and a carriage for retaining the lens blank, one of said drill bit and said carriage moveable toward and away from the other during a drill cycle;
   a central processing unit operably associated with said processing device for controlling operation thereof; and
   a computer program stored on a non-transitory computer readable medium in communication with said central processing unit, said computer program comprising:

a) a plurality of drilling instructions for operably causing one of said drill bit and said carriage to move toward the other by a predetermined distance defining a drill depth; and b) calibration instructions set that compare an expected number of contacts between the drill bit and the lens blank with an actual number of contacts between the drill bit and the lens blank after said plurality of drilling instructions are performed and adjusts each of said drill depths based on the comparison.

13. The processing device of claim 12, wherein said calibration instructions increase said drill depths when the number of actual contacts is less than the number of expected contacts.

14. The processing device of claim 12, wherein said calibration instructions decrease said drill depths when the number of actual contacts is greater than the number of expected contacts.

15. A processing device programmed to drill holes in an ophthalmic lens blank, comprising:

a processing device having a drill bit for drilling holes of variable size in a lens blank;

a central processing unit operably associated with said processing device for controlling operation thereof; and a computer program stored on a medium in communication with said central processing unit, said computer program comprising:

a) a plurality of drilling instruction sets, each of said drilling instruction sets operably causing said processing device to form a hole having a predetermined diameter defining a hole size;

b) a calibration instruction set that receives an input from a user selecting a drilling instruction set that formed a hole closest in size to a user-selected base hole size and adjusts each of the remaining drilling instruction sets to equal the selected drilling instruction set.

16. The processing device of claim 15, wherein said calibration instruction set increases said hole sizes.

17. The processing device of claim 15, wherein said calibration instruction set decreases said hole sizes.

18. A computer program stored on a non-transitory computer readable medium for use in a drilling process employing a lens blank and a processing device, the computer program comprising:

a plurality of drilling instructions, each of said drilling instructions operably causing one of a lens blank and a drill bit associated with a processing device to move toward the other by a predetermined distance defining a drill depth;

a calibration instruction that compares an expected number of contacts between the drill bit and the lens blank with an actual number of contacts between the drill bit and the lens blank after said plurality of drilling instructions are performed and adjusts each of said drill depths based on the comparison.

19. The computer program of claim 18, wherein said calibration instruction increases said drill depths when the number of actual contacts is less than the number of expected contacts.

20. The computer program of claim 18, wherein said calibration instruction decreases said drill depths when the number of actual contacts is more than the number of expected contacts.

* * * * *